(12) United States Patent
Chen et al.

(10) Patent No.: US 11,858,213 B2
(45) Date of Patent: Jan. 2, 2024

(54) METHODS AND APPARATUS FOR VIBRATION-ASSISTED STEREOLITHOGRAPHY

(71) Applicant: UNIVERSITY OF SOUTHERN CALIFORNIA, Los Angeles, CA (US)

(72) Inventors: Yong Chen, Los Angeles, CA (US); Jie Jin, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 86 days.

(21) Appl. No.: 16/440,780

(22) Filed: Jun. 13, 2019

(65) Prior Publication Data

US 2019/0381732 A1 Dec. 19, 2019

Related U.S. Application Data

(60) Provisional application No. 62/685,159, filed on Jun. 14, 2018.

(51) Int. Cl.
*B29C 64/245* (2017.01)
*B29C 64/205* (2017.01)
*B29C 64/10* (2017.01)

(52) U.S. Cl.
CPC ............ *B29C 64/245* (2017.08); *B29C 64/10* (2017.08); *B29C 64/205* (2017.08)

(58) Field of Classification Search
CPC ...... B29C 64/245; B29C 64/10; B29C 64/205
USPC ....................................................... 264/299
See application file for complete search history.

(56) References Cited

U.S. PATENT DOCUMENTS

2020/0324466 A1* 10/2020 Nishida .................. B33Y 10/00

FOREIGN PATENT DOCUMENTS

EP 0467100 A1 * 1/1992 ........... B29C 64/135

OTHER PUBLICATIONS

Liravi, "Separation force analysis and prediction based on cohesive element model for constrained-surface Stereolithography processes." Computer-Aided Design. 69 (2015) 134-142 (Year: 2015).*
Jin, "A vibration-assisted method to reduce separation force for stereolithography." Journal of Manufacturing Processes. 34 (2018) 793-801 (Year: 2018).*
Dale H. Litwhiler; "A Custom Vibration Test Fixture Using a Subwoofer." Proceedings of The 2011 IAJC-ASEE International Conference (Year: 2011).*

(Continued)

*Primary Examiner* — Matthew J Daniels
*Assistant Examiner* — Hana C Page
(74) *Attorney, Agent, or Firm* — SNELL & WILMER LLP

(57) ABSTRACT

A system for additively manufacturing a build part. The system includes a build platform configured for disposition within a resin tank, and a light source configured to cure a layer of resin. The layer of resin is disposed adjacent to a pre-cure build surface of the build part. The system also includes a constrained surface located between the build platform and the light source and configured to form a boundary for the layer of resin disposed between the constrained surface and the pre-cure build surface. The constrained surface is configured to vibrate to reduce a separation force required to separate the constrained surface from a post-cure build surface of the build part. The system also includes a vibratory source configured to vibrate the constrained surface.

14 Claims, 9 Drawing Sheets

(56) References Cited

OTHER PUBLICATIONS

Pan (Yayue Pan, Haiyang He, Jie Xu, Alan Feinerman, (2017) "Study of separation force in constrained surface projection stereolithography", Rapid Prototyping Journal, vol. 23 Issue: 2, pp. 353-361). (Year: 2017).*

Watson ("Piezoelectric ultrasonic micro/milli-scale actuators," Sensors and Actuators, A152 (2009) 219-233). (Year: 2009).*

* cited by examiner

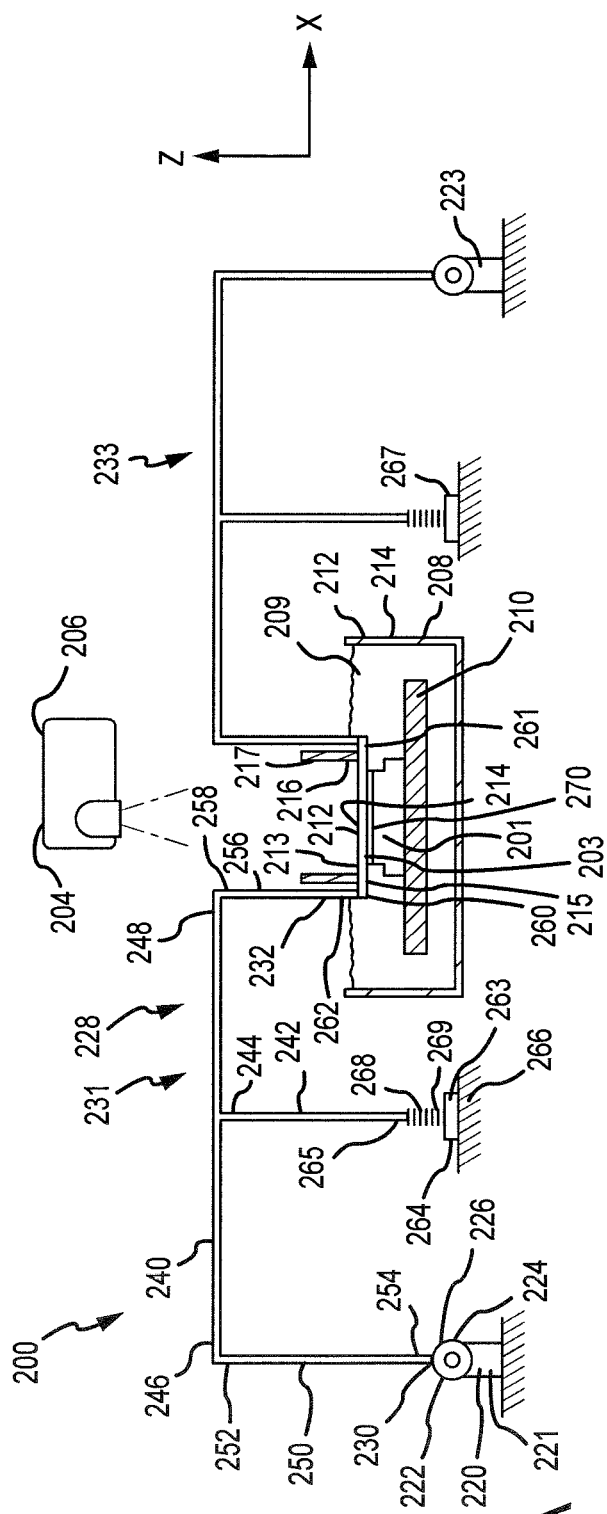
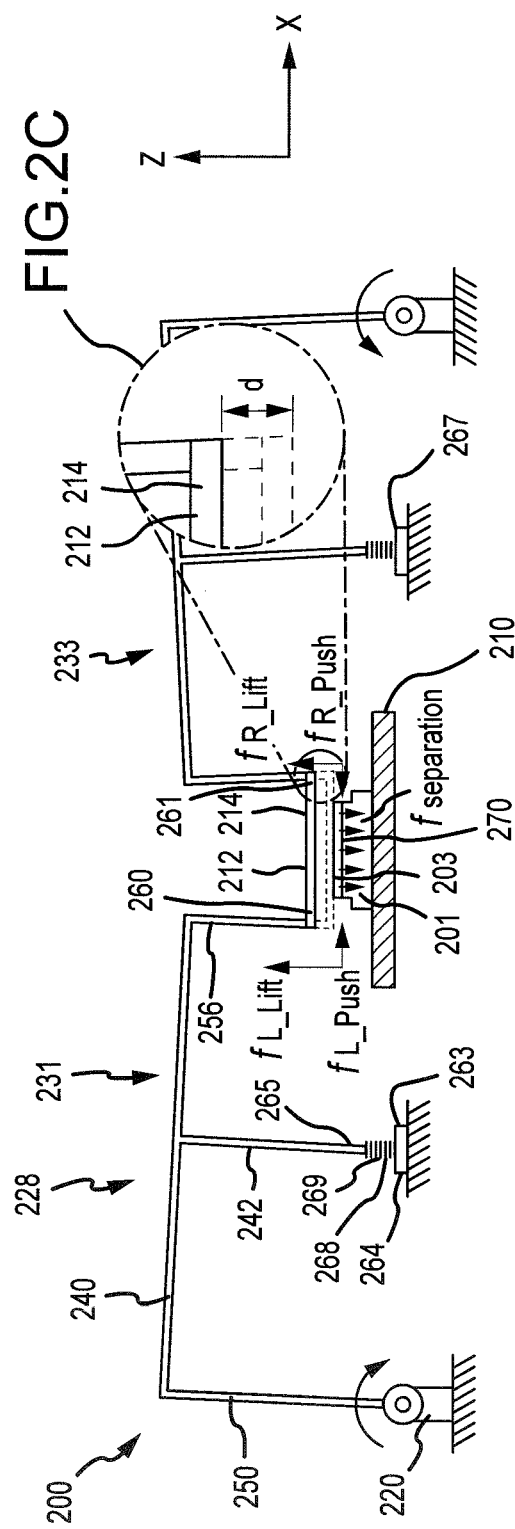
FIG.2A
FIG.2B
FIG.2C

METHODS AND APPARATUS FOR VIBRATION-ASSISTED STEREOLITHOGRAPHY

CROSS-REFERENCE TO RELATED APPLICATIONS

This application claims priority to and the benefit of U.S. Prov. Pat. Appl. No. 62/685,159, entitled "VIBRATION-ASSISTED STEREOLITHOGRAPHY FOR EASY SEPARATION OF LARGE CROSS-SECTIONAL AREAS," filed on Jun. 14, 2018, the entirety of which is hereby incorporated by reference herein for all purposes.

STATEMENT AS TO FEDERALLY SPONSORED RESEARCH

This disclosure was partially supported with government support under contract number CMMI-1151191 awarded by the National Science Foundation. The government may have certain rights in the disclosure.

FIELD

The present disclosure relates generally to stereolithography and, more particularly, to methods and apparatus used with constrained surface stereolithography.

BACKGROUND

Additive manufacturing (AM), also known as 3D printing or rapid prototyping or manufacturing, refers to methods used to fabricate three-dimension objects in a layer-by-layer manner. Typically, the shape of each layer is dynamically controlled by a computer-aided design (CAD) system. An early realization of AM technology concerns stereolithography (SL). In a SL process or method, a liquid photosensitive polymer or resin is solidified by a pattern-controllable irradiating light source, such as, for example, a digital light processing (DLP) projector or a laser beam. Methods based on SL may be employed to produce complex parts having higher geometric accuracy and better surface quality, at faster build speeds and with reduced material waste, than parts fabricated using other AM techniques, such as, for example, extrusion or jetting processes, or with more traditional subtractive manufacturing technologies.

A typical SL process or method (e.g., a free surface method or a constrained surface method) employs a container or a tank containing a resin and configured to receive an irradiating light from a light source to cure select surface portions of the resin in a layer-by-layer fashion. With the free surface method, for example, a photocurable resin is placed within a container, irradiated from above and cured at the liquid surface or interface, which may be exposed to a gaseous atmosphere. Following curing of each successive layer of resin, a platform lowers the component (or build part) undergoing fabrication a distance below the free surface equal to the thickness of each layer and the process is repeated, thereby resulting in a plurality of cured layers stacked upon one another to form the finished component. With the constrained surface method, the photocurable resin is placed within a container having a transparent surface (i.e., the constrained surface) and irradiated from above or below the container, through the transparent surface, such that a layer of resin is cured at an interface (or a gap) between the transparent surface and the then-current build surface of the component undergoing fabrication. Following curing of each successive layer of resin, a platform raises or lowers the component undergoing fabrication by a distance equal to the thickness of one layer and the process is repeated, thereby resulting in a plurality of cured layers stacked upon one another to form the finished component. In contrast to the free surface method, the platform typically moves up or down (depending on the position of the transparent surface relative to the source of irradiation) to let the resin replenish the gap between the build surface and the transparent or the constrained surface.

Constrained surface methods possess several advantages over free surface methods, such as, for example, increased dimensional accuracies, material resin replenishing rates and build speeds. Furthermore, by accurately controlling the size of the gap between the constrained (or transparent) surface and the build surface, parts having thinner layers can be achieved. However, there remain drawbacks with constrained surface methods, one of which concerns difficulties associated with separating each newly cured layer from the constrained surface. Such difficulties may arise via an adhesive bonding developed between each newly cured layer and the constrained surface. Application of a force (e.g., a separation force) may be employed to separate the constrained surface from the build surface following curing of each layer. Application of such separation force may, however, adversely affect various fabrication parameters, such as, for example, the overall speed of the additive process, the reliability of the additive process or the quality of the parts being fabricated thereby, the size or geometric complexity of the parts and the overall life cycle of the constrained surface.

The difficulty with separating the constrained surface from the build surface just described has hindered development of 3D printing or AM for parts having large build surface areas, leading to large areas of surface contact between the build surface and the constrained surface. Various approaches have been proposed to address the difficulty. One approach includes applying a non-stick or air-permeable coating on the constrained surface, such that a force normal to the surface (e.g., a pulling force) may be used to separate the constrained surface from the build surface. Various coatings, such as, for example, polytetrafluoroethene (PTFE) or polydimethylsiloxane (PDMS) films, have been tested for this approach. However, the force required to separate the constrained surface from the build surface remains unacceptably large.

Another approach is based on a peeling mechanism configured to apply a peeling-like force between the constrained surface and the build surface, as the force required for peeling may be less than that required for pulling. To facilitate the peeling process, a tilting motion system is adopted, the system being configured to lift or lower one side of the platform, relative to the constrained surface, while pivoting the platform about the other side. This approach is, however, unsatisfactory for parts having large cross-sectional areas as the designed tilting angle is coupled with and limited by the maximum build surface area the process can accommodate. Furthermore, incorporation of the tilting motion into the process increases the fabrication time resulting in an overall reduction in productivity. A second peeling approach incorporates a two-channel system, configured to change the pull-up force into a shear force. During a horizontal translation, for example, the part undergoing fabrication is separated from the resin tank, facilitating convenient vertical motion of the platform by a pulling-up action. However, a disadvantage of this two-channel approach is the area of the tank should be designed to be at least double the size of the maximum build surface area resulting in increased construction complexity as the build surface area increases.

A continuous liquid interface production process is another approached considered for separating the constrained surface from the build surface. This approach employs a highly air permeable coating configured to increase the oxygen concentration below the constrained surface. Despite some advantages, the approach nevertheless presents significant challenges when used with parts having large build surface areas, as the separation forces remain unacceptably large even though the separation force is inversely proportional to the thickness of the dead zone.

While various other approaches similar to the foregoing have been proposed, the difficulties associated with separating the constrained surface from the build surface remain, particularly as concerns parts having large build surface areas, leading to large areas of surface contact between the build surface and the constrained surface. To address these difficulties, as well as other limitations in constrained surface SL processes, a novel approach is described, which utilizes low frequency vibrations to separate the build surface from the constrained surface with a minimum incremental construction complexity as the build surface area increases. In various embodiments, the approach is a vibration-assisted SL process based on either a top-down or a bottom-up projection system. Experimental comparisons have verified the effectiveness of the approach in significantly reducing the required separation force. Consequently, the vibration-assisted SL process presented in this disclosure provides a beneficial development in the fabrication of parts having a large cross-sectional build surface area.

SUMMARY

A system for additively manufacturing a build part is disclosed. In various embodiments, the system includes a build platform configured for disposition within a resin tank; a light source configured to cure a layer of resin, the layer of resin disposed adjacent a pre-cure build surface of the build part; a constrained surface located between the build platform and the light source and configured to form a boundary for the layer of resin disposed between the constrained surface and the pre-cure build surface, the constrained surface configured to vibrate to reduce a separation force required to separate the constrained surface from a post-cure build surface of the build part; and a vibratory source configured to vibrate the constrained surface.

In various embodiments, the vibratory source is directly connected to the constrained surface. In various embodiments, the vibratory source is at least one of a piezo actuator or a vibratory motor. In various embodiments, the vibratory source is coupled to the constrained surface via a linkage system.

In various embodiments, the linkage system includes a first member configured to couple together the vibratory source, the force sensor and the constrained surface. In various embodiments, a second member connects the force sensor to the first member, a third member connects the vibratory source to the first member and a fourth member connects the constrained surface to the first member. In various embodiments, the vibratory source comprises an audio speaker. In various embodiments, a force sensor is configured to measure the separation force.

In various embodiments, the light source, the constrained surface and the build platform are oriented to perform a top-down stereolithography process. In various embodiments, the light source, the constrained surface and the build platform are oriented to perform a bottom-up stereolithography process.

A method of fabricating a build part using a vibration-assisted stereolithography system is disclosed. In various embodiments, the method includes the following steps: separating a build surface of the build part a distance from a constrained surface to form a gap having a gap thickness; populating the gap thickness with a resin; directing an electromagnetic energy from a light source through the constrained surface to cure the resin residing in the gap; and activating a vibratory source to reduce a separation force required to be overcome in order to separate a post-cure build surface from the constrained surface.

In various embodiments, the method further includes reducing the gap thickness to a layer thickness following populating the gap thickness with the resin. In various embodiments, the method includes applying a separating load to a build platform to partially separate the build surface from the constrained surface prior to activating the vibratory source. In various embodiments, the method includes applying a separating load to a build platform during a time when the vibratory source is activated. In various embodiments, the light source and the constrained surface are oriented to perform either a top-down stereolithography process or a bottom-up stereolithography process.

A vibration-assisted stereolithography system is disclosed. In various embodiments, the system includes a frame; a build platform moveably connected to the frame and configured to raise and lower a build part; a resin tank; a light source configured to cure a layer of resin, the layer of resin disposed adjacent a pre-cure build surface of the build part; a constrained surface located between the build platform and the light source and configured to bound the layer of resin, the layer of resin disposed between the constrained surface and the pre-cure build surface; and a vibratory source configured to reduce a separation force required to separate the constrained surface from a post-cure build surface of the build part.

In various embodiments, the vibratory source is connected to the constrained surface. In various embodiments, the vibratory source is at least one of a piezo actuator or a vibratory motor. In various embodiments, the vibratory source is coupled to the constrained surface via a linkage system. In various embodiments, the light source, the constrained surface and the build platform are oriented to perform either a top-down stereolithography process or a bottom-up stereolithography process.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 2A, 2B and 2C are schematic component views of a top-down vibration-assisted SL apparatus, in accordance with various embodiments;

DETAILED DESCRIPTION

Figure 1A:
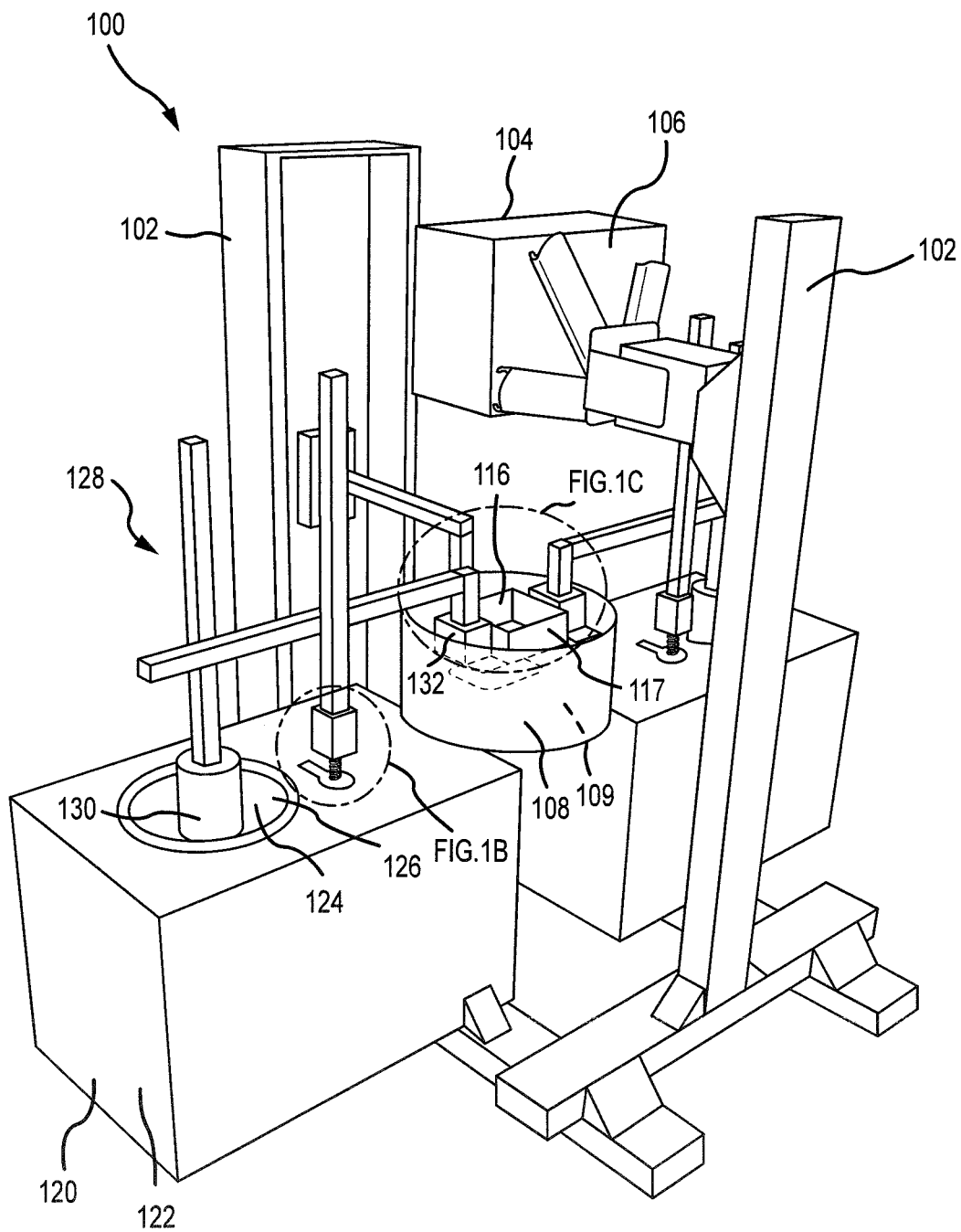
FIGS. 1A, 1B and 1C are schematic perspective and inset views of a top-down vibration-assisted SL apparatus, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As will be described more fully below with reference to the drawings, a vibration-assisted SL system or apparatus and process is disclosed, in accordance with various embodiments. By way of one non-limiting embodiment, the system comprises a top-down mask-image-projection based stereolithography (MIP-SL) system. In contrast with more traditional top-down SL systems or processes, in which a resin surface is constrained by a fixed transparent glass, the vibration-assisted SL system includes a coated transparent glass mounted on two aluminum bars that are configured to vibrate in response to a vibratory source. In one non-limiting embodiment, for example, the vibratory source may comprise a membrane in the paper cone of an audio speaker, such as, for example, an MB42X audio speaker, sold under the brand name Micca®. Instead of using a direct-pull method to separate the build surface from the constrained surface (i.e., the transparent glass) following exposure to an irradiating light source and curing of a layer of resin, the vibration-assisted SL process facilitates vibration of the transparent glass to break a vacuum or other adhesive environment existing between the build surface and the transparent glass, thereby facilitating separation of the transparent glass from the build surface. For clarity, the term build surface used in this disclosure generally refers to the uppermost or the lowermost surface of the build part following curing of a layer. However, where distinction is helpful, the build surface of the build part prior to having a layer of resin cured thereon may be referred to as a pre-cure build surface, while the build surface following curing of a layer of resin upon the pre-cure build surface may be referred to as a post-cure build surface.

Figure 1B:
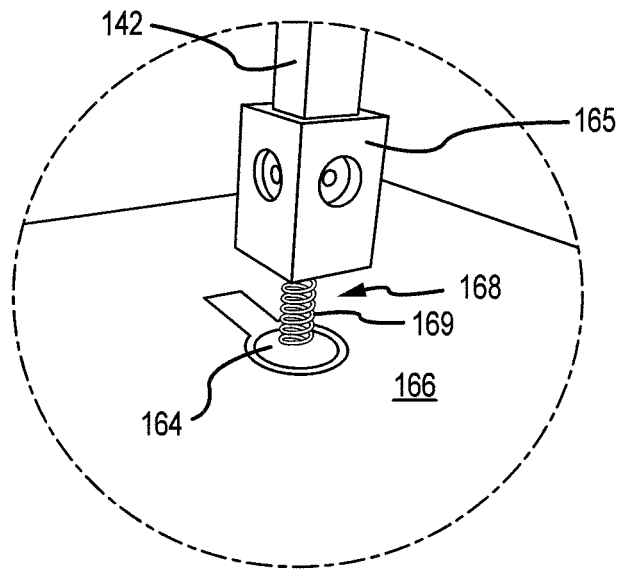
Figure 1C:
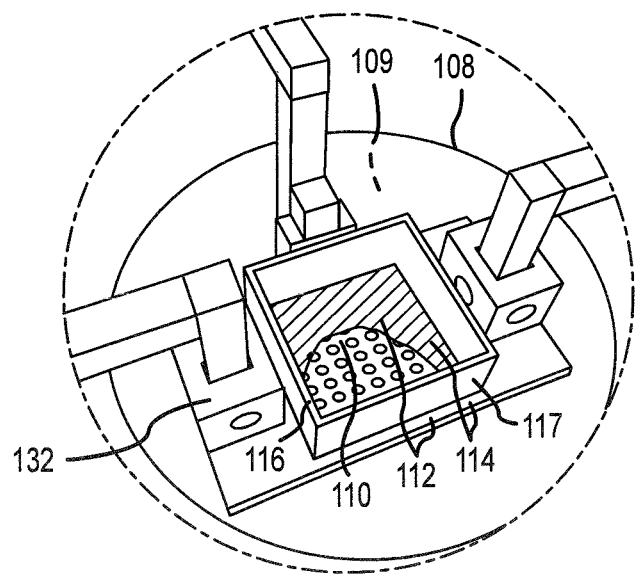

Referring now to FIG. 1A, together with the insets illustrated at FIGS. 1B and 1C, a vibration-assisted SL system 100 is illustrated. In accordance with various embodiments, the vibration-assisted SL system 100 includes a frame 102 configured to position an electromagnetic energy source 104, such as, for example, an ultraviolet light projector 106, a distance away from (e.g., a distance above) a resin tank 108. In various embodiments, the resin tank 108 is configured to surround a build platform 110 and a constrained surface 112 which, in various embodiments, may comprise a transparent glass 114 having an upper surface and a lower surface, the upper surface being generally oriented toward the ultraviolet light projector 106 and the lower surface being generally oriented downward toward a resin 109 contained within the resin tank 108. An artificial boundary 117 may, in various embodiments, be disposed within the resin tank 108 to prevent the resin 109 from flowing onto the upper surface of the transparent glass 114. In various embodiments, the artificial boundary 117 may comprise a wall 116 in the shape of a square or a circle configured to surround the transparent glass 114 or at least a portion of the upper surface thereof.

Still referring to FIGS. 1A-1C, the vibration-assisted SL system 100 may also include a vibratory source 120 which, in various embodiments, may comprise an audio speaker 122 having a membrane 124 in the form of a paper cone 126. As described above, in one non-limiting embodiment, the vibratory source 120 may comprise the MB42X audio speaker, sold under the brand name Micca®, which includes the membrane 124 in the form of the paper cone 126. In various embodiments, vibratory motion from the vibratory source 120 is transmitted to the constrained surface 112 (or to the transparent glass 114) via a linkage system 128 coupled to the constrained surface 112. In one non-limiting embodiment, the linkage system 128 includes a first end 130 connected to the vibratory source 120 and a second end 132 connected to the constrained surface 112 (or to the transparent glass 114). In various embodiments, the linkage system 128 includes a pressure sensor 164 mounted to a stationary base 166. A bias element 168, such as, for example, a coil spring 169, connects the pressure sensor 164 to a second end 165 of a second member 142. Additional details of the linkage system 128 and various of the other components or sub-systems of the vibration-assisted SL system 100 are provided below.

Referring now to FIGS. 2A and 2B, and the inset at FIG. 2C, a schematic view of a vibration-assisted SL system 200, similar to the vibration-assisted SL system 100 described above with reference to FIGS. 1A-1C, is provided. The vibration-assisted SL system 200 includes an electromagnetic energy source 204, such as, for example, an ultraviolet light projector 206, positioned a distance away from (e.g., a distance above) a resin tank 208. In various embodiments, the resin tank 208 is configured to surround a build platform 210 and a constrained surface 212 which, in various embodiments, may comprise a transparent glass 214 having an upper surface 213 and a lower surface 215, the upper surface 213 being generally oriented toward the ultraviolet light projector 206 and the lower surface 215 being generally oriented toward or submerged within a resin 209 contained within the resin tank 208. An artificial boundary 217 may, in various embodiments, be disposed within the resin tank 208 to prevent the resin 209 from flowing onto the upper surface 213 of the transparent glass 214 or at least a portion thereof. In various embodiments, the artificial boundary 217 may comprise a wall 216 in the shape of a square or a circle configured to surround at least a portion of the upper surface 213 of the transparent glass 214. A build part 201 (or a part or a workpiece) undergoing fabrication is also illustrated positioned on the build platform 210 and under the constrained surface 212 or the transparent glass 214. During operation, in one non-limiting embodiment (including the embodiment described below with reference to FIGS. 3A-3D), the ultraviolet light projector 206 is configured to irradiate electromagnetic energy having a wavelength of approximately four-hundred five nanometers (405 nm), at a power consumption level of approximately seven Watts (7 Watts) and with a resolution of 1280×800 pixels. In yet a further non-limiting embodiment (including the embodiment described below with reference to FIGS. 3A-3D), the resin 209 comprises MakerJuice G+, available from MakerJuice Labs.

Still referring to FIGS. 2A-2C, the vibration-assisted SL system 200 may also include a vibratory source 220 configured to vibrate in a generally up and down or vertical direction (e.g., in the Z-direction). In various embodiments, the vibratory source 220 may comprise an audio speaker 222 having a membrane 224 in the form of a paper cone 226, such as, for example, the audio speaker 122 described above with reference to FIGS. 1A and 1B. In various embodiments, vibratory motion from the vibratory source 220 is transmitted to the constrained surface 212 (or to the transparent glass 214) via a linkage system 228 that couples the vibratory source 220 to the constrained surface 212. In one non-limiting embodiment, the linkage system 228 includes a first end 230 connected to the vibratory source 220 and a second end 232 connected to the constrained surface 212 (or to the transparent glass 214). While the disclosure with reference to FIGS. 1A-1C and FIGS. 2A-2C describes the vibratory source 220 as being coupled to the constrained surface 212 or the transparent glass 214 via the linkage system 228, it will be appreciated that the vibratory source 220 (e.g., in the form or a piezoelectric actuator or a vibratory motor or the like) may be directly connected to the constrained surface 212 or to the transparent glass 214 (or to the resin tank 208) without use of a linkage system. For example, in various embodiments, a vibratory source, such as a piezo actuator may be attached directly above or below the constrained surface 212, with no linkage coupling the two components.

In further detail, as illustrated in FIG. 2A, the linkage system 228 includes a first member 240 connected to a second member 242. In various embodiments, the first member 240 is disposed in a substantially horizontal orientation and the second member 242 is disposed in a substantially vertical orientation. The second member includes a first end 244 connected to the first member 240 at a location intermediate a first end 246 and a second end 248 of the first member 240. In various embodiments, the linkage system 228 further includes a third member 250 having a first end 252 connected to the first end 246 of the first member 240 and a second end 254 connected to the vibratory source 220. Similarly, a fourth member 256 includes a first end 258 connected to the second end 248 of the first member 240 and a second end 262 connected to a first side 260 of the constrained surface 212. In various embodiments, the third member 250 and the fourth member 256 are oriented in a substantially vertical orientation, being both substantially parallel to the second member 242 and substantially perpendicular to the first member 240. In various embodiments, the linkage system 228 includes a pressure sensor 264 mounted to a stationary base 266. A bias element 268, such as, for example, a coil spring 269, connects the pressure sensor 264 to a second end 265 of the second member 242. The bias element 268 (e.g., the coil spring 269) is configured to store energy when the linkage system 228 vibrates in response to a vibratory input signal delivered by the vibratory source 220. In various embodiments, the bias element 268 will compress or extend in response to motion of the second member 242 but will not influence a maximum value of a force applied to the pressure sensor. The bias element 268 may also be configured to filter vibratory noise within the linkage system 228 similar to operation of a capacitor in an electrical circuit.

As illustrated in FIGS. 2A and 2B, the vibration-assisted SL system 200 may also include additional linkage systems, similar to the linkage system 228 described above. Thus, in various embodiments, for example, the vibration-assisted SL system 200 may include a first linkage system 231, having the various components described above with reference to the linkage system 228, and a second linkage system 233, being a mirror image of the first linkage system 231 and being connected to a second side 261 of the constrained surface 212. The first linkage system 231 will vibrate in response to a first vibratory source 221 (e.g., the vibratory source 220) and transmit the vibrational energy to the first side 260 of the constrained surface 212, while the second linkage system 233 will vibrate in response to a second vibratory source 223 and transmit the vibrational energy to the second side 261 of the constrained surface 212. During operation, in one non-limiting embodiment (including the embodiment described below with reference to FIGS. 3A-3D), a sine wave is used as the vibratory input signal, having a frequency of 60 Hz.

As illustrated in FIGS. 2B and 2C, during operation, an uppermost build layer 270 of the resin 209 will be solidified following exposure of electromagnetic energy (e.g., ultraviolet light) through a mask image or via a pattern-controllable irradiating light source. A vacuum (or otherwise adhesive) environment is formed between a build surface 203 of the build part 201 and the lower surface 215 of the transparent glass 214. As the build platform 210 is lowered to separate the build surface 203 and the constrained surface 212 or the lower surface 215 of the transparent glass 214, a separation force, $f_{separation}$ (i.e., the force required to separate the build surface 203 from the constrained surface 212), will result due to the vacuum environment. Due to the vibratory input signal at the vibratory source 220, the transparent glass 214 will be pulled down a distance "d," at which time the vacuum environment breaks and the build surface 203 detaches from the constrained surface 212 or the transparent glass 214. A downward displacement of the fourth member 256 will also result, as indicated in FIGS. 2B and 2C (the downward displacement is overemphasized in the drawings). The vibratory source 220 (e.g., the membrane 224 or the paper cone 226) at this time may be considered a hinge for simplification. At the same time, the bias element 268 (e.g., the coil spring 269) mounted to the second end 265 of the second member 242 will be gradually compressed, resulting in an increase in the force applied to the pressure sensor 264. As indicated in FIG. 2B, let $f_{L\_Lift}$ denote a vertical lift force(in the Z-direction) the fourth member 256 applies to the first side 260 of the transparent glass 214. Likewise, let $T_{R\_Lift}$ denote the vertical lift force the second linkage system 233 applies to the second side 261 of the transparent glass 214. Further, let $f_{L\_Push}$ and $f_{R\_Push}$ denote the horizontal force (in the X-direction) applied to the first side 260 and to the second side 261 of the transparent glass 214, respectively. A force balance provides the following relations (Equations 1a and 1b):

$$|f_{separation}|=|f_{L\_Lift}|+|f_{R\_Lift}|$$

and $$f_{L\_Push}+f_{R\_Push}=0.$$

These relations are used below in describing a beneficial operation of a vibration-assisted SL process and apparatus, in accordance with various embodiments.

Figure 3A:
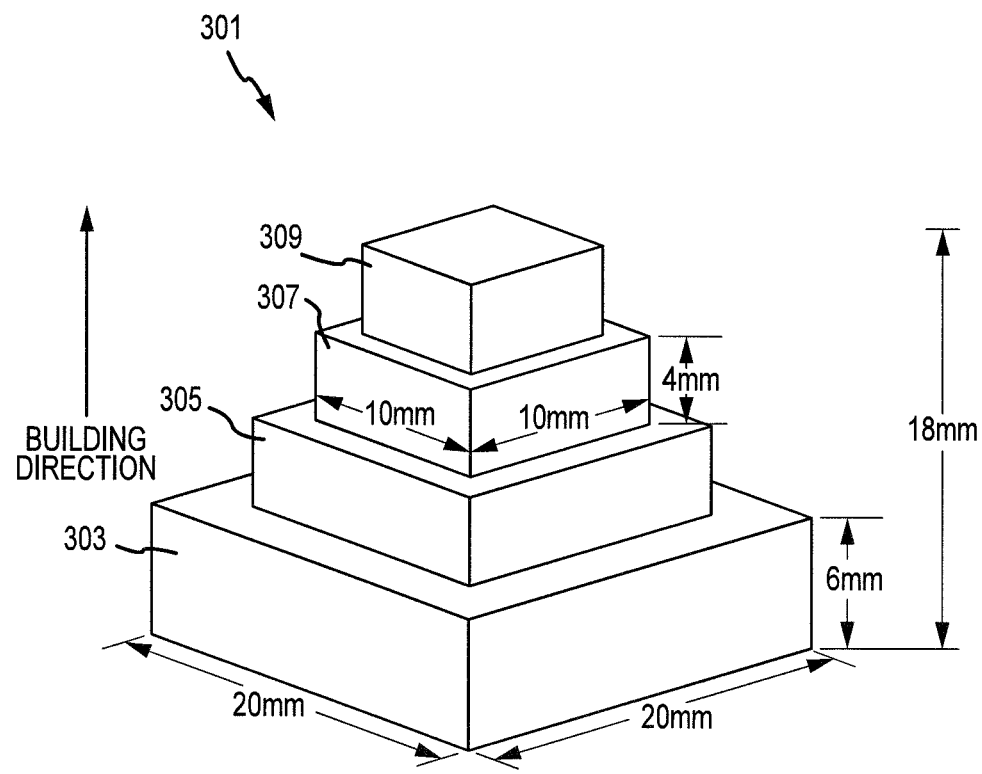
FIG. 3A is a CAD model of a build part having various sections with differing build surface areas, in accordance with various embodiments.

Referring now to FIG. 3A, a CAD model for a build part 301 used to test the applicability of a vibration-assisted SL system, such as, for example, the vibration-assisted SL system 100 or the vibration-assisted SL system 200 described above with reference to FIGS. 1A and 2A, is illustrated. As described below, controlled experiments are conducted to study the effect of vibration on the separation force. The CAD model includes different sections having different cross-sectional areas to study the relationship between (i) the printing cross-sectional area and the separation force and (ii) the difference between vibrating the constrained surface and not vibrating the constrained surface. Data from a first pressure sensor 263 and a second pressure sensor 267 (see FIGS. 2A and 2B) is collected and analyzed as follows in regard to fabricating the build part 301 using the vibration-assisted SL system 100 described above with reference to FIG. 1A and its schematic counterpart, the vibration-assisted SL system 200.

As illustrated in FIG. 3A, the CAD model includes four different sections. The dimensional size of each section is labeled in FIG. 3. Basically, the cross-sectional shape of each section is a square and the cross-sectional area of each section is halved, section by section. Each layer thickness for the build part 301 is one-hundred micrometers (100 μm). A base section 303 (or a first section) includes sixty (60) layers and each of a second section 305, a third section 307 and a fourth section 309 (or a top section) includes forty (40) layers. The additional twenty (20) layers for the base section 303 is to eliminate the influence of over compression in fabricating the first several build layers of the base section 303.

Details of the printing process for the build part 301 are as follows. First, forty (40) layers for the base section 303 are fabricated using a typical SL method, where no vibration is applied to the constrained surface (e.g., the transparent glass 114 in FIG. 1A). Thus, for each layer, the constrained surface is separated from the build surface of the build part 301 by moving the platform downward without vibration applied to the constrained surface. An exposure time is set as forty seconds (40 s) for the first three layers and twelve seconds (12 s) for the subsequent layers. Subsequently, an additional twenty (20) layers for the base section 303 are added with vibration of the constrained surface enabled. Each of the second section 305, the third section 307 and the fourth section 309 are then fabricated, each section including a first twenty (20) layers fabricated with vibration of the constrained surface disabled, followed by an additional twenty (20) layers fabricated with vibration of the constrained surface enabled.

Figure 3B:
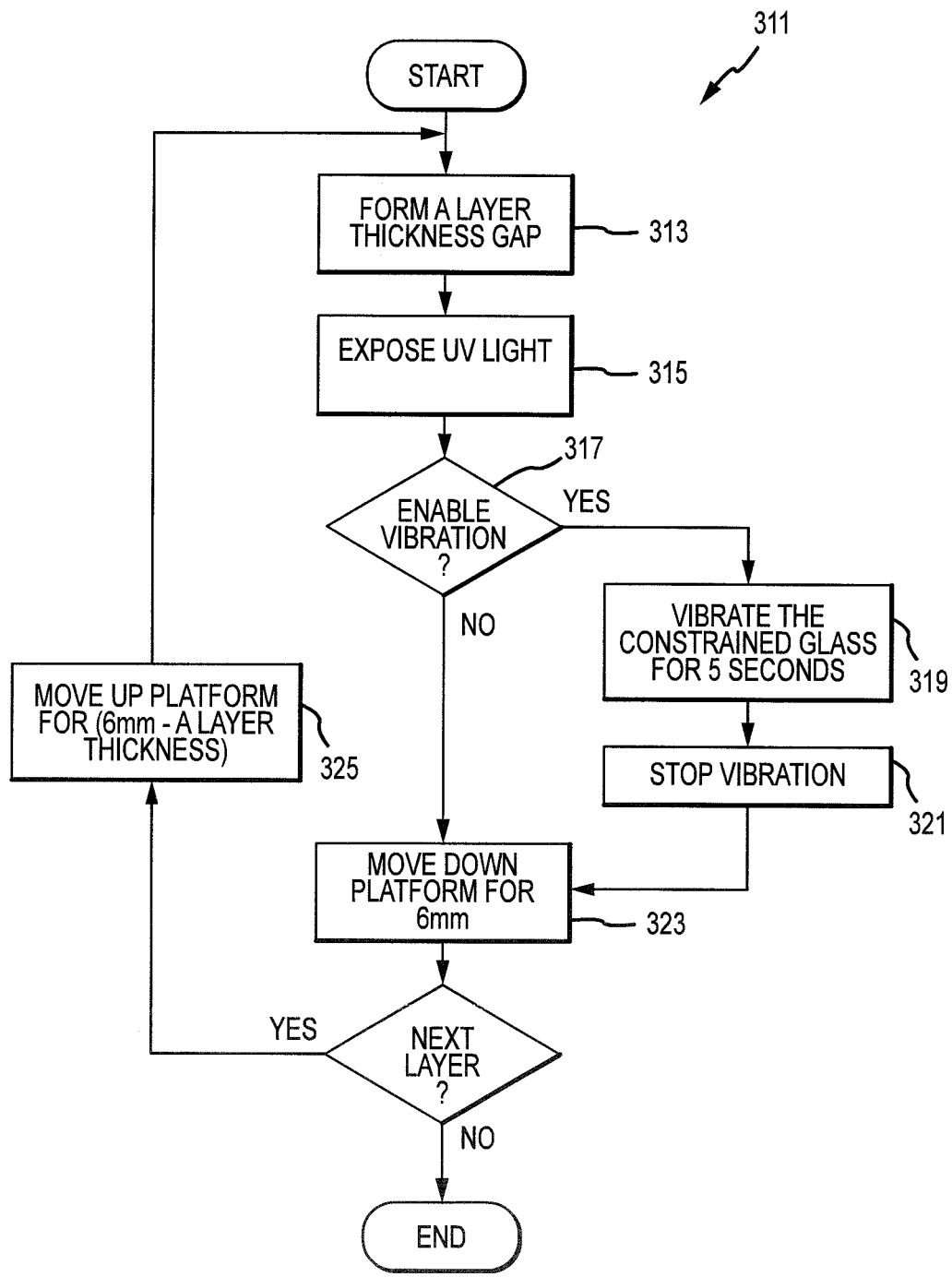
FIG. 3B is a flowchart depicting various method steps in performing a vibration-assisted SL process, in accordance with various embodiments.

Referring now to FIG. 3B, a method 311 for fabricating the build part 301 described above is illustrated. In a first step 313, a thickness gap equal to one layer thickness (e.g., 100 μm) is formed by lowering a build platform (e.g., the build platform 110 described above with reference to FIG. 1A) a distance sufficient to allow the resin to populate the gap between the constrained surface and the build platform (for the first layer) or the build surface (for all subsequent layers) and then raising the build platform to the layer thickness. In a second step 315, ultraviolet light is exposed through the transparent glass of the constrained surface (e.g., through a portion of the transparent surface not masked) for a time sufficient to cure the resin in the gap. In a third step 317, a decision is made whether to enable vibration or disable vibration of the constrained surface, as described above. Where vibration is enabled, a fourth step 319 enables vibration of the constrained surface for a period of time (e.g., five (5) seconds), followed by a fifth step 321 that stops the vibration. After the vibration is stopped, in a sixth step 323, the build platform is again lowered a distance sufficient to allow the resin to populate or replenish a gap between the constrained surface and the build surface (e.g., six millimeters (6 mm)). If a subsequent layer is to be fabricated, in a seventh step 325, the build platform is raised to form the gap (or the layer thickness) for the next layer. Where vibration is disabled or not enabled at the third step 317, the method proceeds to the sixth step 323 and then proceeds accordingly. Once no further layers are fabricated, the method terminates.

Figure 3C:
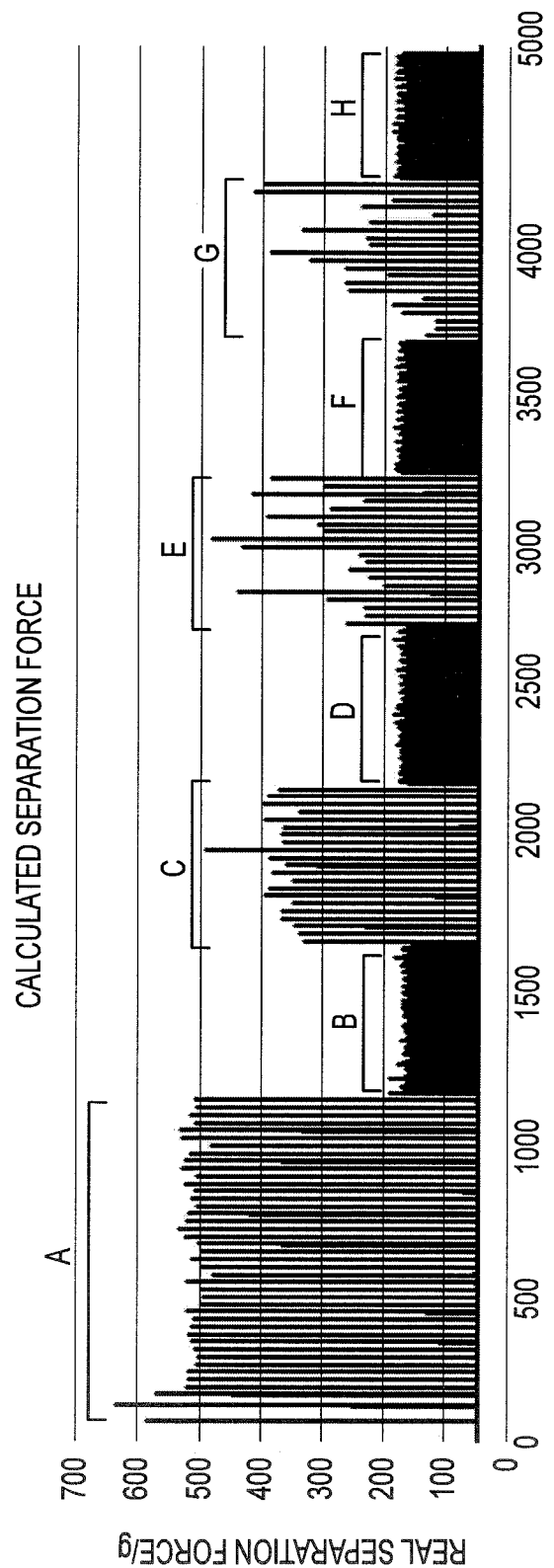
FIGS. 3C and 3D are graphs illustrating experimental results of the vibration-assisted SL process depicted in FIG. 3B, in accordance with various embodiments.
Figure 3D:
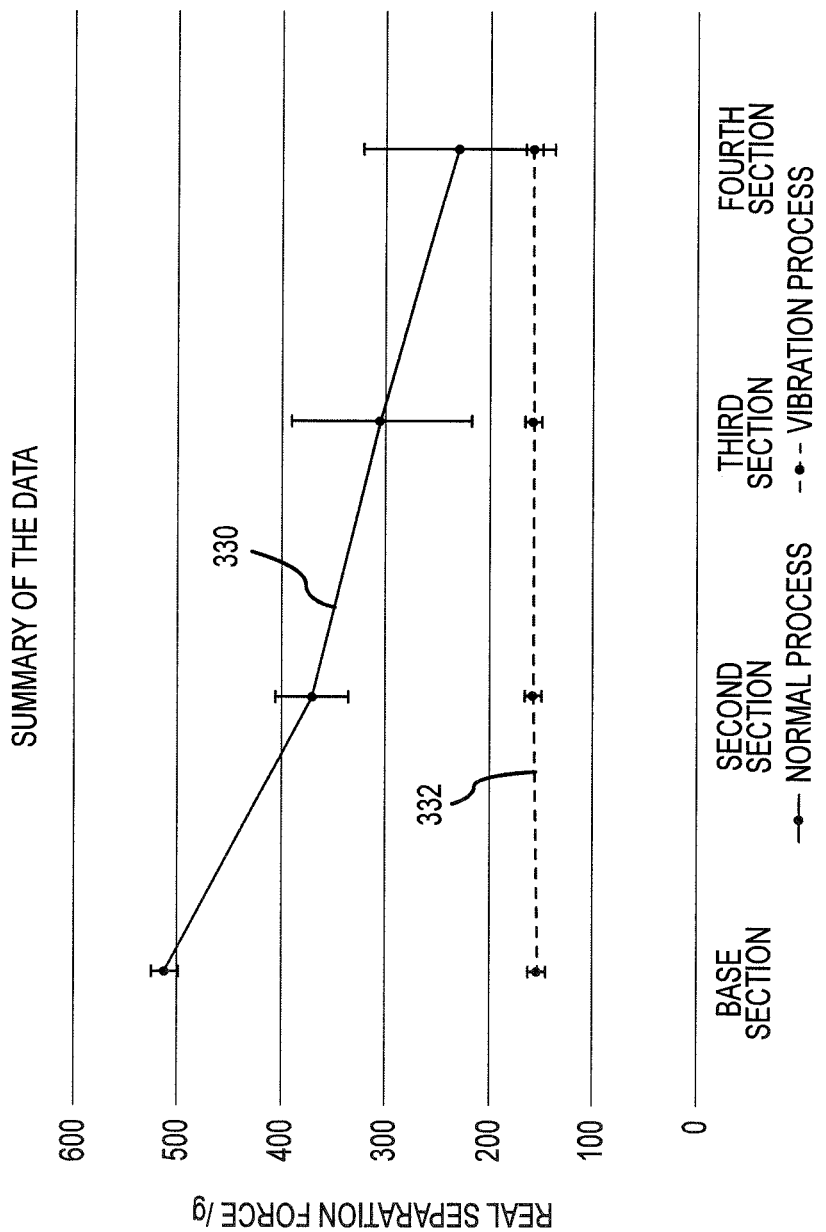

Referring now to FIGS. 3C and 3D, results from the test method used to fabricate the build part 301 using the vibration-assisted SL system 100 or the vibration-assisted SL system 200, as described above with reference to FIGS. 3A and 3B, are illustrated. Data from the first pressure sensor 263 and the second pressure sensor 267 (see FIGS. 2A and 2B) is sampled at a constant rate of 200 Hz, which is considered sufficient to capture the separation force during fabrication of each section of the build part 301. Raw data is read from the first pressure sensor 263 and the second pressure sensor 267 with the corresponding time recorded. The raw data is converted into $f_{L\_Lift}$ (corresponding to the first pressure sensor 263) and $f_{R\_Lift}$ (corresponding to the second pressure sensor 267) through the following relations (Equations 2a and 2b):

$$f_{L\_lift}(x)=159.3 \log(x-23.15)-49.08$$

$$f_{R\_Lift}(x)=283.5 \log(x)-859.8$$

The R-square values for the relations are 0.9836 and 0.9942, respectively, which is acceptable and indicates the natural logarithmic relations used to model the raw data provide a close fit with the raw data. By applying equation 1a, above, the separation force is obtained by summing $f_{L\_Lift}$ and $f_{R\_Lift}$. The measured and then calculated separation force over time is illustrated in FIG. 3C, with the separation force normalized by the force of gravity, g.

Referring to FIG. 3C, the data obtained is organized and plotted into eight groups labeled from A-H. The data from groups A-B is sampled from the base section 303 of the CAD model of the build part 301 as shown in FIG. 3A. The data from groups C-D is sampled from the second section 305 of the CAD model. The data from groups E-F is sampled from the third section 307 of the CAD model. The data from groups G-H is sampled from the fourth section 309 of the CAD model. As described above, the data from groups A, C, E and G is obtained from a normal or typical SL printing process without applying vibration to the constrained glass and the data from groups B, D, F and H is obtained from a vibration-assisted SL printing process with applying the vibration to the constrained glass. By combining the data from groups A, C, E and G, a decreasing trend of the separation force as the build surface area decreases in the normal SL printing process is observed. However, the data from the groups B, D, F and H indicates the separation force is independent of the build surface area in the vibration-assisted SL printing process. Specifically, the force in the groups B, D, F and H appears caused by the upward and downward movement during vibration rather than a separation force due to the aforementioned vacuum or adhesive environment as is measured in the normal SL printing process without vibration.

Referring now to FIG. 3D, a plot of the mean value of the data and the standard deviation provide in FIG. 3C for group A, C, E and G (normal SL printing process) and group B, D, F and H (vibration-assisted SL printing process), respectively, is provided. As indicated in FIG. 3D, when comparing the data obtained from the normal SL printing process 330 and the data obtained from the vibration-assisted SL printing process 332, it becomes apparent that as the build surface area increases, the vibration applied on the constrained surface results in a significant reduction of the separation force. Further, unlike other methods aiming to reduce the separation force, some of which are described above, the vibration-assisted SL printing process disclosed herein does not dramatically increase the mechanical construction complexity, even if the required maximum build surface area is large.

Figure 4:
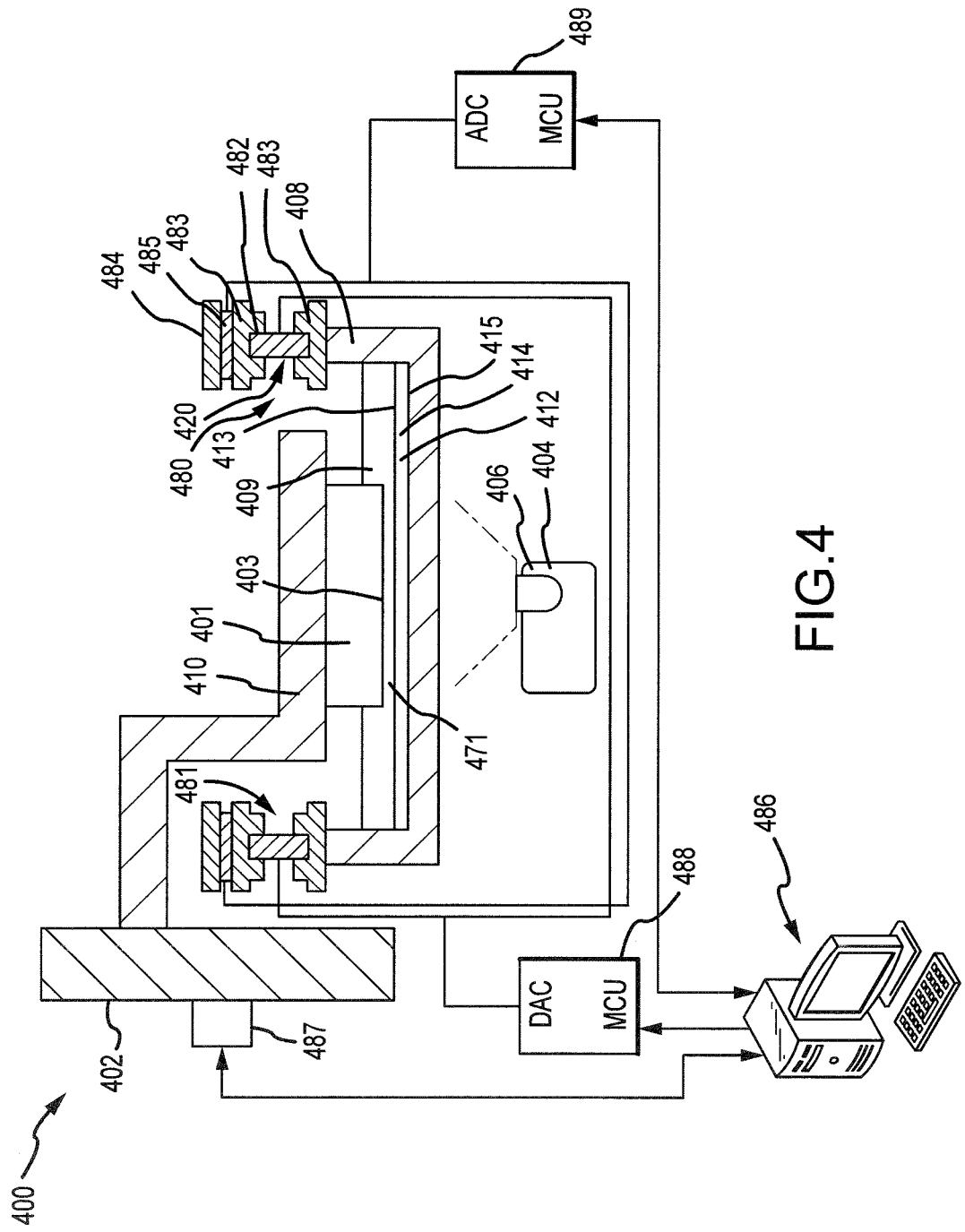
FIG. 4 is a schematic view of a bottom up vibration-assisted SL apparatus, in accordance with various embodiments.

Referring now to FIG. 4, a vibration-assisted SL system 400 is illustrated. In contrast to the vibration-assisted SL system 100 and the vibration-assisted SL system 200 described above with reference to FIGS. 1A and 2A, which are representative of "top-down" SL processes and apparatus, whereby the top of the build part is progressively lowered during the fabrication process, the vibration-assisted SL system 400 is representative of a "bottom-up" SL process or apparatus, whereby the bottom of the build part is progressively raised by the platform. In accordance with various embodiments, the vibration-assisted SL system 400 includes a frame 402 configured to position an electromagnetic energy source 404, such as, for example, an ultraviolet light projector 406, a distance away from (e.g., a distance below) a resin tank 408. In various embodiments, the resin tank 408 is configured to surround a build platform 410 and a constrained surface 412 which, in various embodiments, may comprise a transparent glass 414 having an upper surface 413 and a lower surface 415, the lower surface 415 being generally oriented toward the ultraviolet light projector 406 and the upper surface 413 being generally oriented toward an upper surface of a resin 409 within the resin tank 408. Similar to the foregoing discussion, a build part 401 is fabricated on or otherwise attached to the build platform 410. In various embodiments, the build part 401 represents an accumulation of layers of the resin 409 that is cured, layer-by-layer, to form the build part 401, each layer being cured by ultraviolet light being emitted from the ultraviolet light projector 406 and traveling upward through the resin tank 408 and the transparent glass 414 into a gap defined by a lower surface of the build part (i.e., a build surface 403) and the upper surface 413 of the transparent glass 414. While the foregoing described the system as including both the resin tank 408 and the transparent glass 414, it will be appreciated that the transparent glass 414 may be incorporated into the resin tank 408 and be a part thereof.

Still referring to FIG. 4, the vibration-assisted SL system 400 includes a vibratory source 420 or, in various embodiments, a plurality of vibratory sources, such as, for example, a first vibratory source 480 and a second vibratory source 481. The vibratory source 420 may, for example, include a piezo actuator 482 (or similar vibratory mechanism, such as, for example, a vibrating motor). In various embodiments, the piezo actuator 482 is disposed within a clamp 483, that is itself disposed between the resin tank 408 and a mounting member 484, the mounting member 484 being generally stationary with respect to the resin tank 408. In various embodiments, the vibration-assisted SL system 400 further includes a force sensor 485 which, in various embodiments, may be disposed between the mounting member 484 and the clamp 483. Similar to the discussion above, the force sensor 485 may be configured to provide raw data representative of a separation force developed between the build surface 403 and the upper surface 413 of the transparent glass 414.

In various embodiments, the vibration-assisted SL system 400 may include a computer system 486 (e.g., a processor) configured to control operation of the build platform 410 and the vibratory source 420 and to store data provided by the force sensor 485. For example, the computer system 486 may be configured to control operation of a motor 487 configured to raise and lower the build platform 410. The computer system 486 may also be configured to control operation of the vibratory source 420 via a first controller 488 which, in various embodiments, may include a microcontroller, digital-to-analog circuitry and a power amplifier. In various embodiments, the computer system 486 may also be configured to control operation of the force sensor via a second controller 489 which, in various embodiments, may include a microcontroller, analog-to-digital circuitry and resistance-to-voltage conversion circuitry.

During operation, similar to the description above for the vibration-assisted SL system 100, a lowermost build layer 471 of the resin 409 will be solidified following exposure of electromagnetic energy (e.g., ultraviolet light) through a mask image or via a pattern-controllable irradiating light source. A vacuum (or otherwise adhesive) environment may be formed between the build surface 403 of the build part 401 and the upper surface 413 of the transparent glass 414. As the build platform 410 is raised to separate the build surface 403 and the constrained surface 412 or the transparent glass 414, a separation force (i.e., the force required to separate the build surface 403 from the constrained surface 412) will result due to the vacuum environment. In the presence of vibration introduced through the vibratory source 420, however, the separation force is substantially reduced (or even eliminated) compared to the separation force that would result in the absence of such vibration. Thus, during operation of the vibration-assisted SL system 400, the vibratory source 420 is activated, in various embodiments, subsequent to activation of the electromagnetic energy source 404 or the ultraviolet light projector 406 and curing of the lowermost build layer 471. The vibratory source 420 remains activated for a period of time (e.g., five seconds (5 s)) or until the build surface 403 and the constrained surface 412 or the transparent glass 414 are separated, at which point the process repeats, similar to the process described with reference to FIG. 3B.

Figure 5:
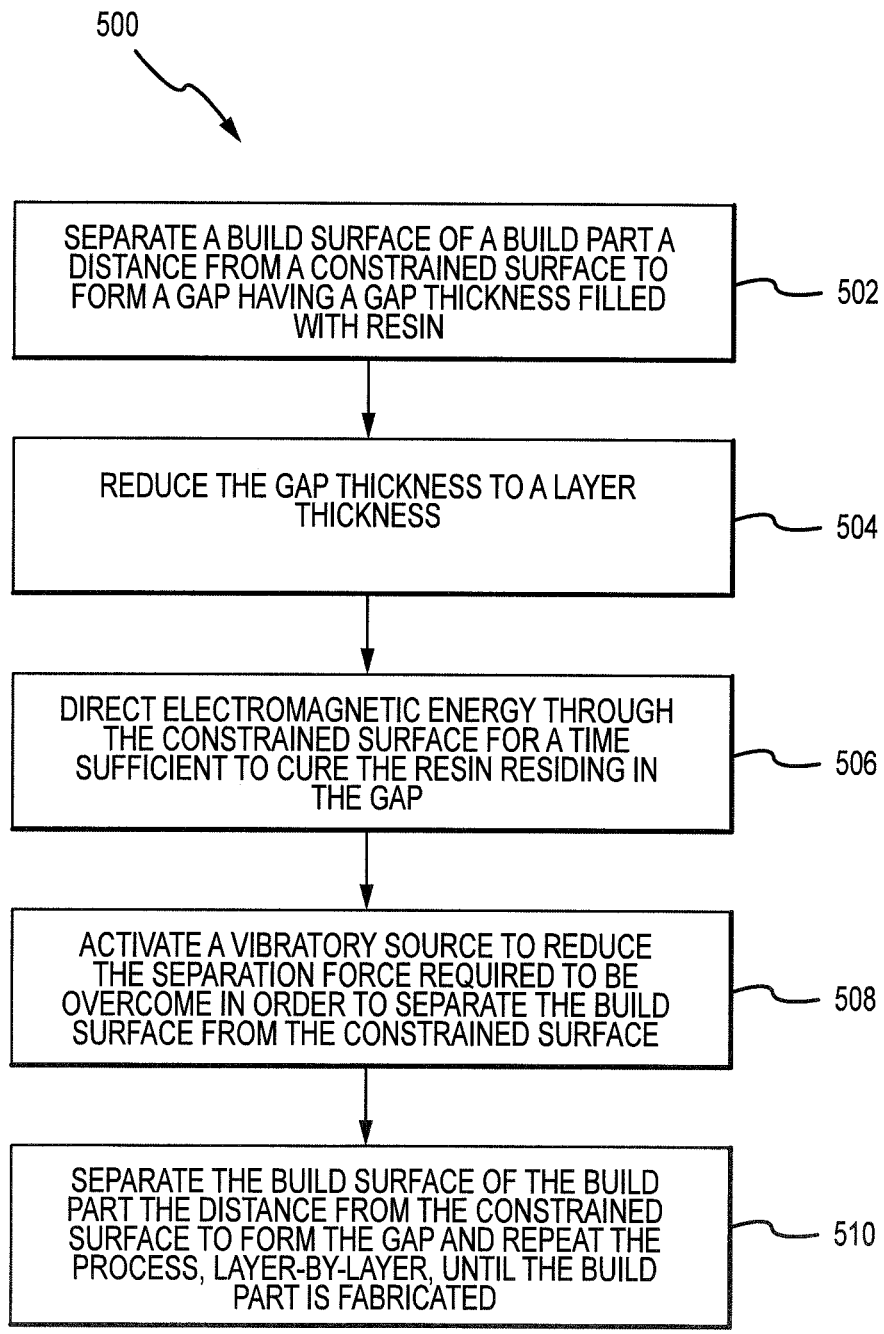
FIG. 5 describes various method steps in performing a vibration-assisted SL process, in accordance with various embodiments.

Referring now to FIG. 5, various steps of a method 500 of fabricating a build part using a vibration-assisted SL system are described. As will be appreciated from the disclosure provided above, the method is applicable to both a top-down stereolithography process or apparatus and a bottom-up stereolithography process or apparatus. In a first step 502, a build surface of a build part is separated a distance from a constrained surface to form a gap having a gap thickness (e.g., 6 mm) and a resin is allowed to flow into or otherwise populate, replenish or permeate the gap. In a second step 504, the gap thickness is reduced to a layer thickness (e.g., 100 μm). In a third step 506, an electromagnetic source of energy is irradiated through the constrained surface for a time sufficient to cure the resin residing in the gap. In a fourth step 508, a vibratory source is activated to reduce the separation force required to be overcome in order to separate the build surface from the constrained surface. In a fifth step 510, the build surface of the build part is separated the distance from the constrained surface to form the gap and the process repeated, layer-by-layer, until the build part is fabricated.

In various embodiments, following the third step 506, whereby the electromagnetic source of energy is irradiated through the constrained surface for a time sufficient to cure the resin residing in the gap is performed, a separating load is applied to a build platform to partially separate the build surface from the constrained surface a set distance (e.g., 50 μm), after which the vibratory source is activated to separate the build surface from the constrained surface. In various embodiments, following the third step 506, whereby the electromagnetic source of energy is irradiated through the constrained surface for a time sufficient to cure the resin residing in the gap is performed, a separating load is applied to the build platform at or near the same time as the vibratory surface is activated to separate the build surface from the constrained surface. In various embodiments, the separating load may be configured to separate the build surface from the constrained surface at a fixed velocity (e.g., 5 μm/s), during which time the vibratory surface is activated to separate the build surface from the constrained surface.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method of fabricating a build part using a vibration-assisted stereolithography system, comprising:
   separating a build surface of the build part a distance from a constrained surface to form a gap having a gap thickness;
   populating the gap thickness with a resin;
   at a first time, directing electromagnetic energy from a light source through the constrained surface to cure the resin residing in the gap;
   at a second time after the first time, applying a separating load including a downward displacement force along a first directional axis to a build platform to at least partially separate the build surface from the constrained surface; and
   at a third time after the first time, vibrating the constrained surface upwardly and downwardly along the first directional axis to separate, post-cure, the build surface from the constrained surface, wherein the vibrating is a 60 Hz sine wave and comprises:
      activating a vibratory source connected to the constrained surface by a linkage system having a first end connected to the vibratory source and a second end connected to the constrained surface to generate the vibrating the constrained surface; and
      filtering, by a bias element having a coil spring attached to the linkage system, the vibrating the constrained surface.

2. The method of claim 1, further comprising reducing the gap thickness to a layer thickness following populating the gap thickness with the resin.

3. The method of claim 1, wherein the light source and the constrained surface are oriented to perform either a top-down stereolithography process or a bottom-up stereolithography process.

4. The method of claim 1, wherein vibrating the constrained surface to separate, post-cure, the build surface from the constrained surface includes using an audio speaker to separate the build surface from the constrained surface.

5. A method of fabricating a build part using a vibration-assisted stereolithography system, comprising:
   separating a build surface of the build part a first distance from a constrained surface to form a gap having a gap thickness;
   populating the gap thickness with a resin;
   at a first time, directing an electromagnetic energy from a light source through the constrained surface to cure the resin residing in the gap;
   at a second time after the first time, vibrating, by an audio speaker receiving a vibratory input signal, outputting a vibratory response signal, and connected to the constrained surface, the constrained surface along a same direction as the first distance to separate, post-cure, the build surface from the constrained surface;
   applying a separating load to a build platform while vibrating the constrained surface; and
   filtering, by a bias element comprising a coil spring connected to the constrained surface, the vibratory response signal,
   wherein the vibratory input signal includes a sine wave.

6. The method of claim 5, further comprising reducing the gap thickness to a layer thickness following populating the gap thickness with the resin.

7. The method of claim 5, wherein the light source and the constrained surface are oriented to perform either a top-down stereolithography process or a bottom-up stereolithography process.

8. The method of claim 5, wherein the sine wave is a 60 Hz sine wave.

9. A method of fabricating a build part using a vibration-assisted stereolithography system, comprising:
   separating a build surface of the build part a distance from a constrained surface to form a gap having a gap thickness;
   populating the gap thickness with a resin;
   at a first time, directing electromagnetic energy from a light source through the constrained surface to cure the resin residing in the gap;
   at a second time after the first time, applying a separating load including a downward displacement force along a first directional axis to a build platform to at least partially separate the build surface from the constrained surface; and
   at a third time after the first time, vibrating the constrained surface upwardly and downwardly along the first directional axis to separate, post-cure, the build surface from the constrained surface, wherein the vibrating comprises:
      activating a vibratory source connected to the constrained surface by a linkage system having a first end connected to the vibratory source and a second end connected to the constrained surface to generate the vibrating the constrained surface;
      using the vibratory source including an audio speaker to separate the build surface from the constrained surface; and
      filtering, by a bias element having a coil spring attached to the linkage system, the vibrating the constrained surface.

10. The method of claim 9, further comprising reducing the gap thickness to a layer thickness following populating the gap thickness with the resin.

11. The method of claim 9, wherein the light source and the constrained surface are oriented to perform either a top-down stereolithography process or a bottom-up stereolithography process.

12. The method of claim 9, wherein the vibration is sinusoidal.

13. The method of claim 9, wherein the vibration is a 60 Hz sine wave.

14. A method of fabricating a build part using a vibration-assisted stereolithography system, the system comprising (i) a build platform to support a build part during building and (ii) a first linkage system connecting a first vibratory source to a first side of a constrained surface, the method comprising:
   moving the build platform supporting the build part to separate a build surface of the build part a distance from the constrained surface to form a gap between the build surface having a gap thickness, wherein the moving is a first direction parallel a first axis;
   populating the gap thickness with a resin;
   at a first time, directing an electromagnetic energy from a light source through the constrained surface to cure the resin residing in the gap;
   at a second time after the first time, applying a separating load along the first axis parallel to the first direction, to the build platform to at least partially separate the build surface from the constrained surface; and
   at a third time after the first time, activating the first vibratory source at a 60 Hz sine wave to transmit a vibration through the first linkage system, the vibration filtered by a bias element having a coil spring attached to the first linkage system, the filtered vibration oscillating the constrained surface along the first direction to separate, post-cure, the build surface from the constrained surface.

* * * * *